United States Patent
DiSabatino et al.

(10) Patent No.: US 6,176,280 B1
(45) Date of Patent: Jan. 23, 2001

(54) DISC SAW FELLING HEAD CHIP PATH MANAGEMENT CONSTRUCTION

(75) Inventors: Benjamin DiSabatino, Brantford; Eric J. Hartsell; Maurice Micacchi, both of Woodstock, all of (CA)

(73) Assignee: Timberjack, Inc., Ontario (CA)

( * ) Notice: Under 35 U.S.C. 154(b), the term of this patent shall be extended for 0 days.

(21) Appl. No.: 09/415,154

(22) Filed: Oct. 8, 1999

Related U.S. Application Data

(63) Continuation of application No. 09/106,447, filed on Jun. 29, 1998, now Pat. No. 6,068,035.
(60) Provisional application No. 60/052,310, filed on Jul. 11, 1997.

(51) Int. Cl.$^7$ ................................................. A06G 23/08
(52) U.S. Cl. ...................... 144/34.1; 30/379.5; 144/4.1; 144/336
(58) Field of Search ............... 83/840–844, 928; 30/379, 379.5; 144/4.1, 34.1, 24.13, 335–338

(56) References Cited

U.S. PATENT DOCUMENTS

| 4,932,447 | 6/1990 | Morin | 144/34.1 |
| 4,987,935 | 1/1991 | Corcoran et al. | 30/379.5 |
| 5,113,919 | 5/1992 | MacLennan | 144/34.1 |
| 5,794,674 | * 8/1998 | Kurelek | 144/34.1 |

OTHER PUBLICATIONS

Applicant's Exhibit A –Timberjack "2618/2628 Level Swing Feller Bunchers" brochure, two pages, admitted prior art.
Applicant's Exhibit B –Photo of Denharco "Snowblower" type discharge, admitted prior art.
Applicant's Exhibit C –Photos of Hydro–Ax 22 Ex Bunching Saw discharge, admitted prior art.
Applicant's Exhibit D –P. 5 of "Tigercat Safety Bulletin" showing prior art chip spray patterns, admitted prior art.
Applicant's Exhibit E –P. 12 of "Tigercat Safety Bulletin" discussing "Saw housing entrance and exit space", admitted prior art.

* cited by examiner

Primary Examiner—W. Donald Bray
(74) Attorney, Agent, or Firm—Quarles & Brady LLP

(57) ABSTRACT

A disc saw felling head has the cutting pocket positioned relative to the tooth entry opening into the housing such that chips being thrown out of the kerf by the teeth are thrown radially outwardly of the entry opening. The chips are thrown against a deflector plate which redirects them back toward the center but away from the disc to dissipate energy in the chips, reduce the directions in which chips are thrown, and reduce clogging of the housing.

14 Claims, 7 Drawing Sheets

DISC SAW FELLING HEAD CHIP PATH MANAGEMENT CONSTRUCTION

CROSS REFERENCE TO RELATED APPLICATIONS

This is a continuation of U.S. patent application Ser. No. 09/106,447 filed Jun. 29, 1998, and now U.S. Pat. No. 6,068,035, which claims the benefit of U.S. Provisional Patent Application No. 60/052,310 filed Jul. 11, 1997.

BACKGROUND OF THE INVENTION

1. Field of the Invention

This invention relates to disc saw felling heads of the type that are used in tree feller bunchers, and in particular to a construction for managing the path of chips which are cut from the kerf.

2. Discussion of the Prior Art

Feller bunchers are well known and are used for harvesting standing trees. In one type, a disc having peripheral teeth is rotated about a generally vertical axis and is advanced through the tree so that the teeth cut a horizontal kerf in the tree trunk. The teeth have radially outward tips which actually do the cutting of the kerf. When the tips are advanced all the way through the tree, the cut tree is rested on a butt plate which overlies the disc, radially inward of the teeth. The butt plate is supported by the housing of the felling head, which encloses the teeth in the zone behind the cutting and accumulating pocket. The teeth are exposed at the front of the cutting and accumulating pocket, which is necessary so as to cut the tree, and the pocket is circumscribed on its sides and rear by pocket walls. The pocket walls extend generally vertically and help restrain the tree trunks as several cut trees are accumulated on top of the butt plate in the pocket. Several trees are typically accumulated in the pocket before they are laid down to be transported or "skidded" to the roadside for loading onto a truck.

The cutting discs are relatively large in diameter (e.g. four feet) and are rotated at relatively high speed (e.g. 1,200 rpm). Thus, considerable energy is stored in the spinning disc, enough to fell a large tree in a matter of seconds. Since the height of the kerf is relatively high, on the order of about an inch or more, the volume of chips removed from the kerf is relatively high. Also, with all the energy stored by the disc, the chips are thrown a considerable distance. If rocks, dirt or other foreign objects get into the tooth path, they can be thrown even further.

As mentioned above, the teeth are only exposed outside of the housing for a limited angle of the head, at the front of the pocket. At the downstream side of the pocket (downstream meaning in the direction of rotation of the disc) there is a housing entry opening in the housing where the teeth re-enter the housing. It is a problem when so many chips or other objects are ingested through this opening into the housing so that the housing clogs, which wastes energy by slowing down the disc and causes wear to the disc, teeth and housing.

FIGS. 1 and 2 show front and top views, respectively, of a typical disc saw feller buncher head having a pocket P, a disc D, teeth T spaced about the periphery of the disc, a butt plate B forming part of the housing H, and pocket walls W. Arms A are hydraulically operated to hold cut trees over the butt plate B. The head is secured to the front of a tractor or similar vehicle (e.g., a track vehicle) and operated by the operator of the tractor to selectively fell and bunch trees as described above.

FIGS. 3–6 illustrate aspects of chip management in various prior art felling head constructions. In FIG. 3, a window O is cut in the housing H just downstream of where the teeth enter the housing H. The window O is meant to provide a space for throwing the chips out of the housing H after they enter it. Such windows are prone to becoming clogged if the volume or size of chips exceeds its capacity, especially in wet conditions. Also, chips exiting the window O can be thrown relatively large distances to the side of and in back of the head.

FIG. 4 illustrates a prior art construction somewhat similar to that shown in FIG. 3, but in which the window O is covered by a deflection plate E, which chips are intended to bounce off of and be directed downwardly. While this solves the problem of throwing the chips to the side and in back of the head, this construction is particularly prone to becoming clogged, as chips are not only restricted by the window O, but can become wedged in the duct formed between the window O and the plate E.

FIGS. 5 and 6 illustrate two different prior art heads, particularly in the area of the housing entry opening of the head. Either of these constructions may be used with the window O, or window O with deflection plate E constructions of FIGS. 3 and 4. FIGS. 5 and 6 illustrate the openings X, which are formed in the downstream pocket walls at the mouth of the pocket. While it is desirable to keep the entry opening X as small as possible, in prior art head constructions chips were still thrown or pushed into the opening X to an extent that clogging was a problem, or to an extent which made chip discharge windows or other discharge devices necessary to be cut into or added to the housing.

SUMMARY OF THE INVENTION

The invention provides a construction of a disc saw felling head which manages chip flow without cutting holes, or windows in or providing chutes or ducts on the housing of the head. It does this by spacing the housing entry opening a distance downstream along the tooth path from the pocket. Chips are thrown away from the housing entry opening, so the number of chips entering the housing is reduced.

In an especially useful aspect, the downstream edge of the mouth of the pocket is spaced upstream along the tooth path from the entry opening by a distance such that a tangent line drawn at the inner perimeter of the chip packing depth in the tooth gullet (the open space in front of each tooth) at the point at which the inner perimeter crosses the downstream edge of the mouth does not intersect the housing entry opening. Preferably, a deflector plate extends radially outward from the housing entry opening, and the tangent line intersects the deflector plate. The deflector plate and tangent line should form an obtuse angle so that chips are bounced off the deflector plate back toward the center, but away from the disc.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENTS

Figure 6:
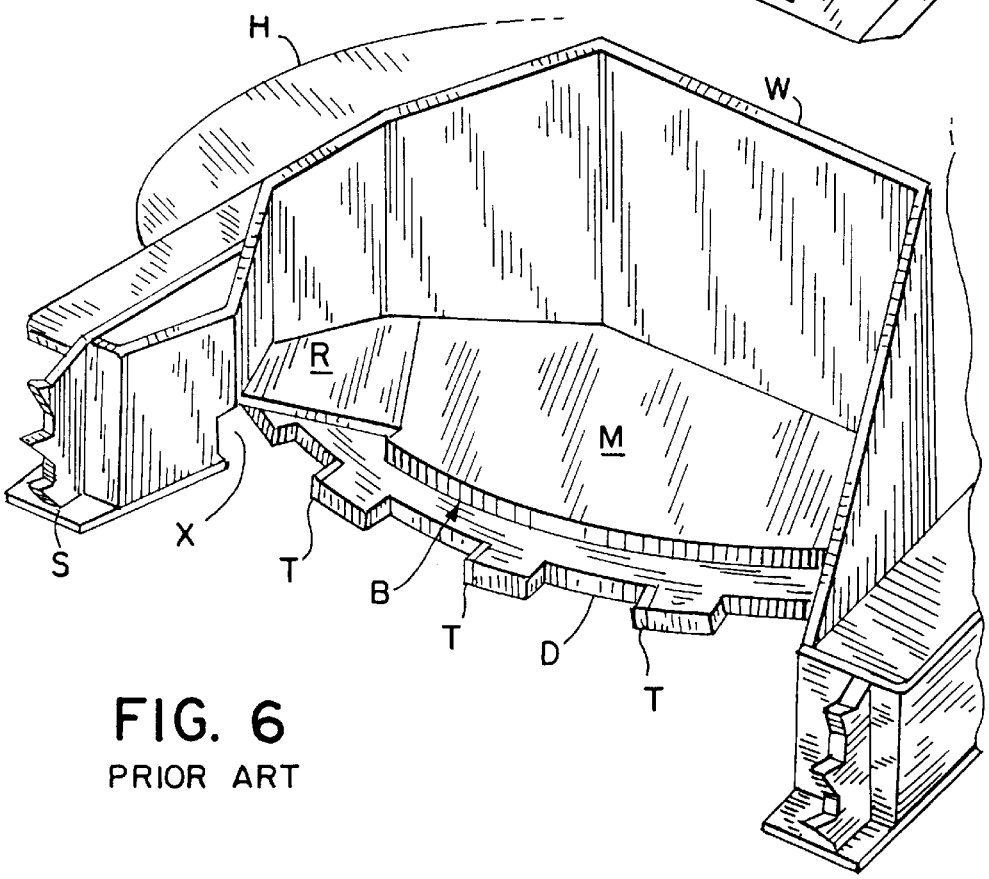
FIG. 6 is a view like FIG. 5 but of a different prior art head.
Figure 7:
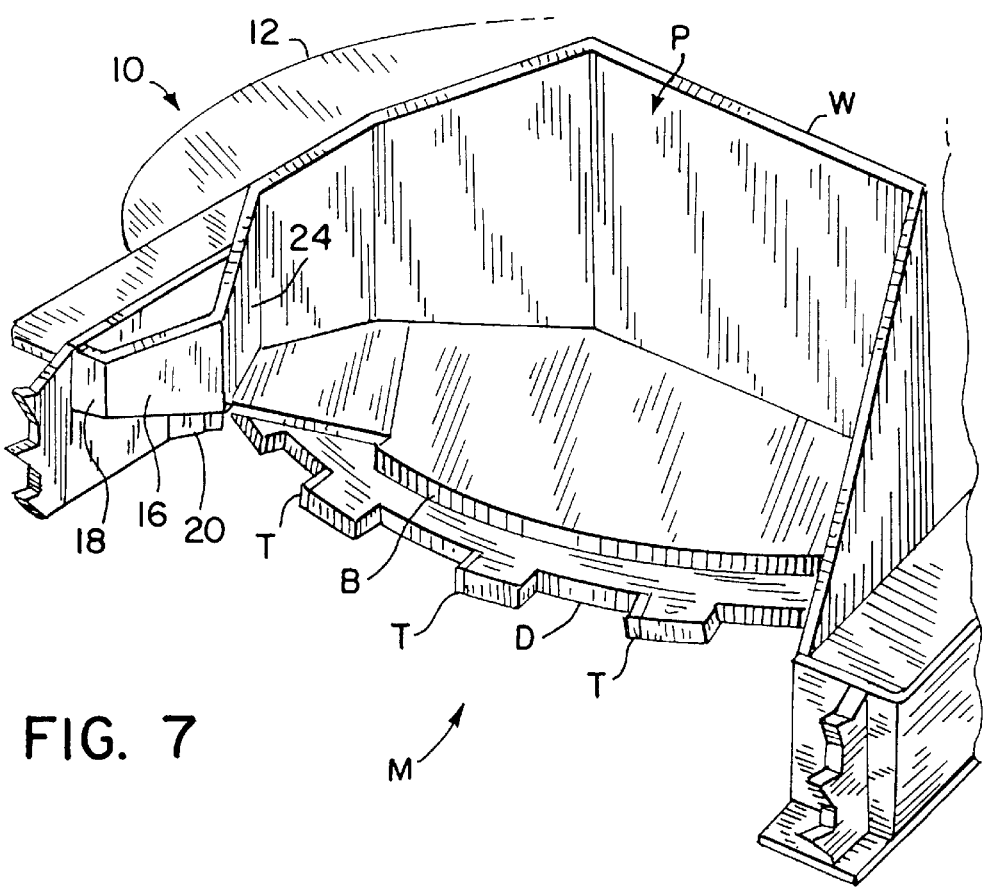
FIG. 7 is a view similar in perspective to FIGS. 5 and 6, but of a felling head incorporating the invention.

FIG. 7 illustrates a felling head 10 which incorporates the invention. Felling head 10 is most like the side pocket head shown in FIG. 6, but has been modified to incorporate the invention. Head 10 only differs from the head shown in FIG. 6 in the area below the butt plate B where the teeth re-enter the housing 12. Also, no window O is cut into the housing 12 (and also no deflector plate E is added) in the head 10.

Figure 8:
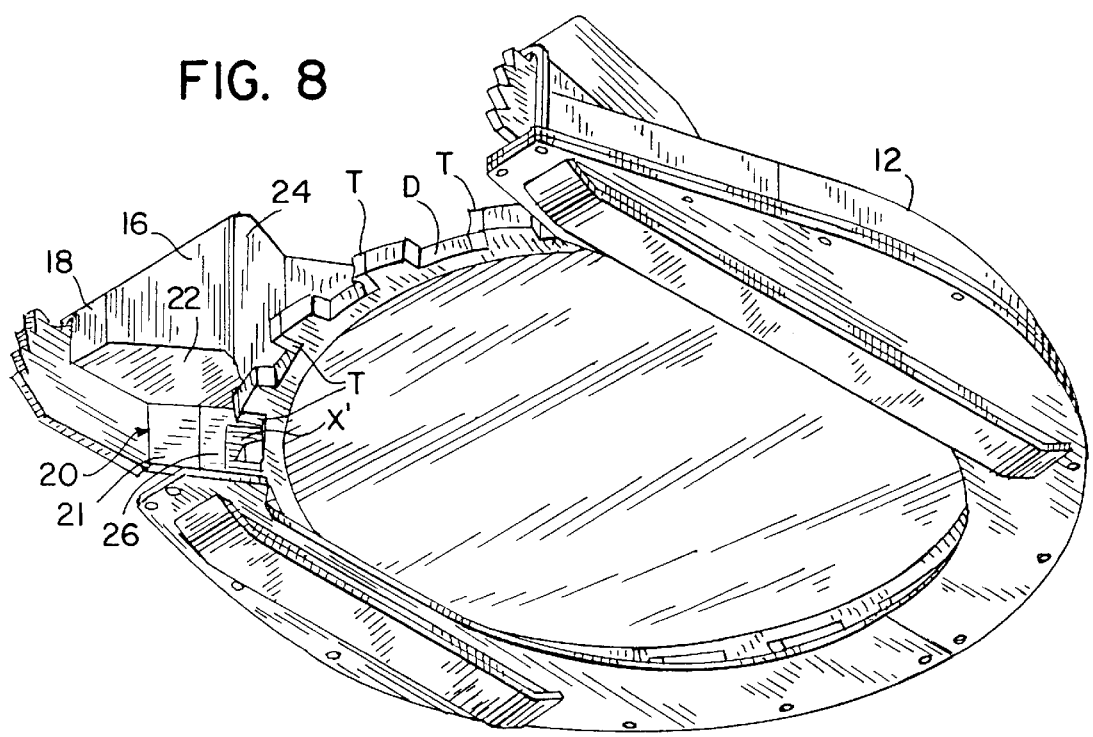
FIG. 8 is a bottom perspective view of the head of FIG. 7.

Comparing FIG. 7 to FIG. 6, the portions of the pocket walls 16 and 18 below the butt plate B have been removed and a deflector plate 20 (which includes support plate 21 and optional wear plate 26 welded to the support plate 21) has been added downstream of the prior art opening X shown in FIG. 6. The skid plate S shown in FIG. 6 has also been removed, although this would not be necessary to practice the invention. As best shown in FIG. 8, a base plate 22 has been added (i.e., welded on) to close off the bottoms of the pocket walls 16, 18 and 24.

Figure 9:
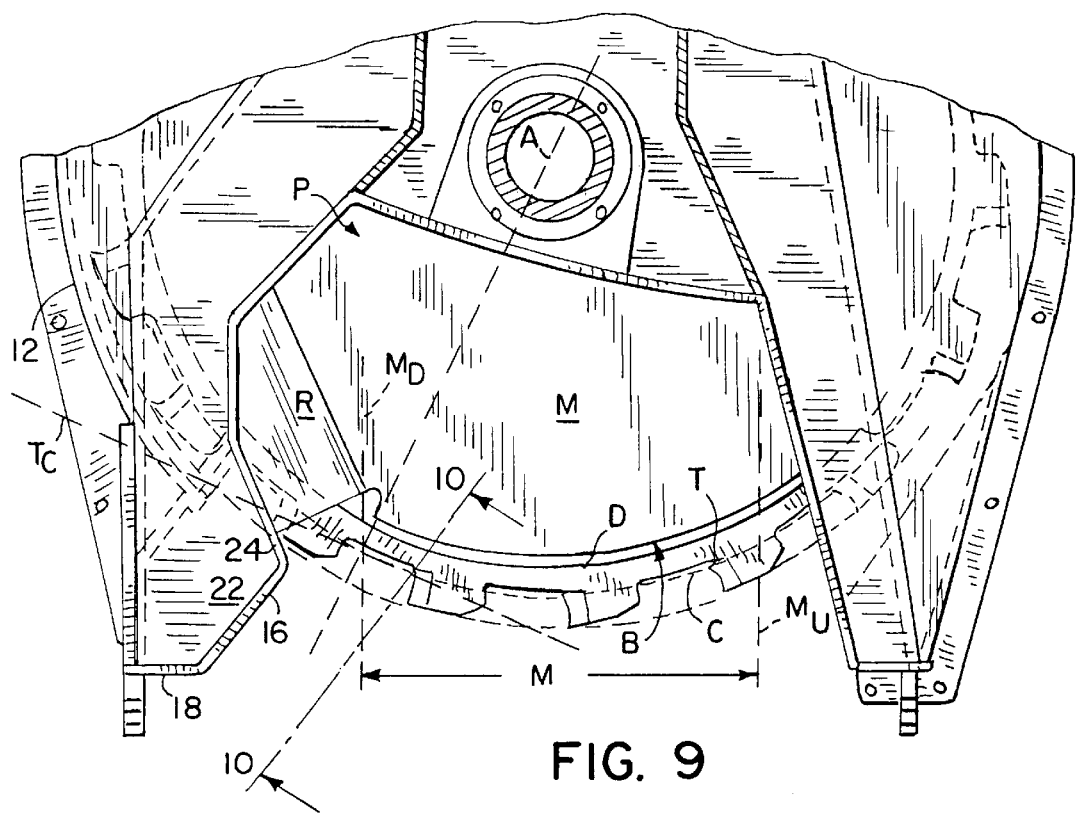
FIG. 9 is a top plan view with portions broken away of the head of FIGS. 7 and 8.
Figure 10:
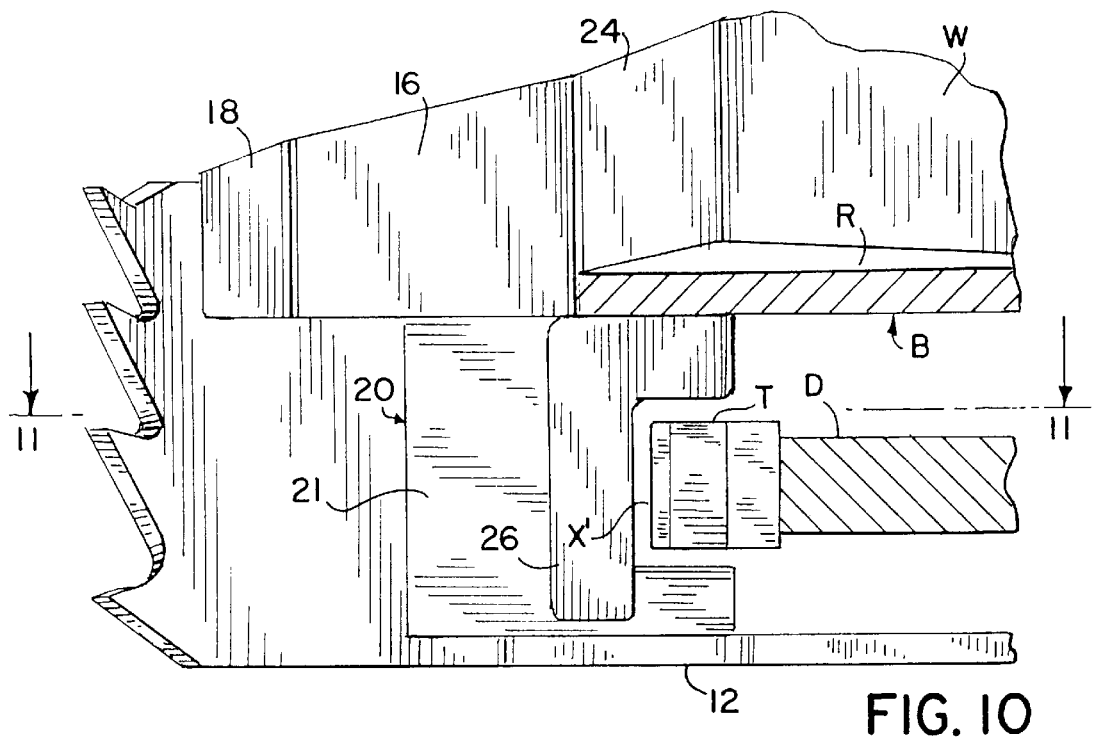
FIG. 10 is a partial sectional view from the plane of the line 10—10 of FIG. 9.
Figure 11:
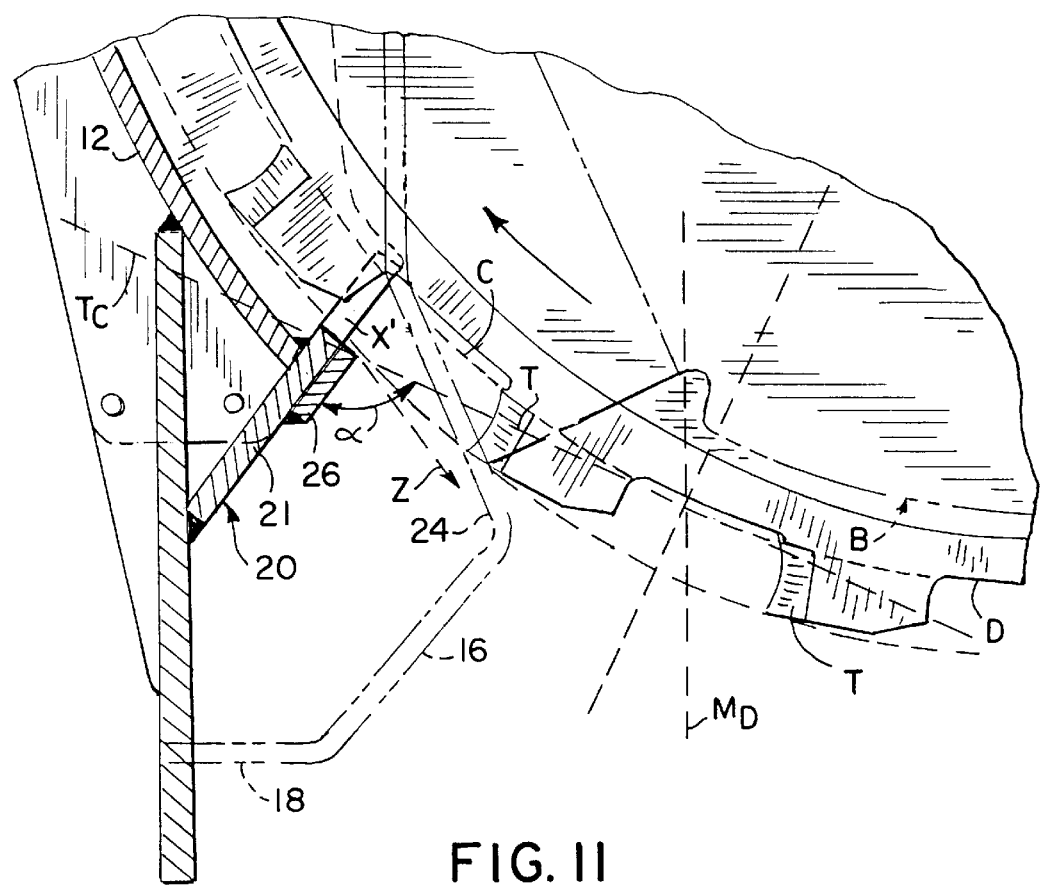
FIG. 11 is a partial sectional view from the plane of the line 11—11 of FIG. 10.

The effects of these modifications are best considered with reference to FIGS. 9 and 11. The mouth M of the pocket is the tree entry opening at the front of the pocket through which a tree may pass in the machine direction into the pocket, as the tree is cut by the blade. The butt plate B in FIG. 7 (and also in FIG. 6) has a ramp R which ramps up over the teeth T from the main part M of the butt plate B, which is at a lower level parallel to the blade and radially inward of the teeth. As the tree is cut, the cut end of the tree rides up over the main part M and is supported thereby. The ramp R increases the area of the pocket P in which trees may be accumulated, as they can ride up onto the ramp R from the main part M. The ramp R, together with the base plate 22, also provides an upper wall which borders the upper side of the circular path which the teeth T traverse between the pocket P and the housing entry opening X'. However, the ramp R reduces the width of the mouth M since a tree will run into the edge of the ramp R if it is attempted to be cut outside of the inner edge of the ramp R. Thus, the inner corner of the ramp R defines the downstream edge, line $M_D$, of the mouth M (downstream being in the direction of rotation of the blade). The upstream edge of the mouth M is defined by line $M_U$, which intersects the rear corner of the pocket P on the opposite side of the pocket, as shown in FIG. 9.

Circular line C defines the anticipated chip packing depth of chips as chips are cut from the kerf. The chip packing depth of chips is dependent upon such things as tree size, feed rate (the rate at which the blade is moved into the tree) and tooth spacing. As chips are cut in the kerf, they accumulate in the open space in front of each tooth, referred to as the tooth gullet space. The chips are thrown radially outwardly in this space, due to centrifugal force, but as they accumulate they build up radially inwardly to a certain chip packing depth. If they build up too much, for example due to a large tree or an excessive feed rate, they may become packed excessively against the base of the gullet (i.e. the outer edge of the disc in the gullet area) and may stall the disc. It is an object of the invention to ensure that all of the chips, including those that are furthest radially inwardly in the gullet, follow a trajectory when they exit the kerf such that they are not thrown into the saw housing, but are deflected as described below.

Line $T_C$ is a tangent to the line C at the point at which line $M_D$ crosses line C. This point represents the position of the innermost chip at the chip packing depth of chips at the downstream edge of the mouth, where the chip exits the kerf. As can be seen in FIG. 11, tangent line $T_C$ does not intersect the opening X', but rather intersects the wear plate 26, which is part of the deflector 20.

The invention takes advantage of the realization that chips being discharged from the kerf of the tree are thrown from the teeth T at a tangent to where the teeth T exit the kerf being cut in the tree. Since the downstream edge $M_D$ of the mouth in a construction of the invention prevents the tree from getting any closer to the housing entry opening X' than the line $M_D$, the invention insures that a tree cannot get so close to the opening X' so that chips are thrown or shoveled into the opening X' by the teeth.

Figure 3:
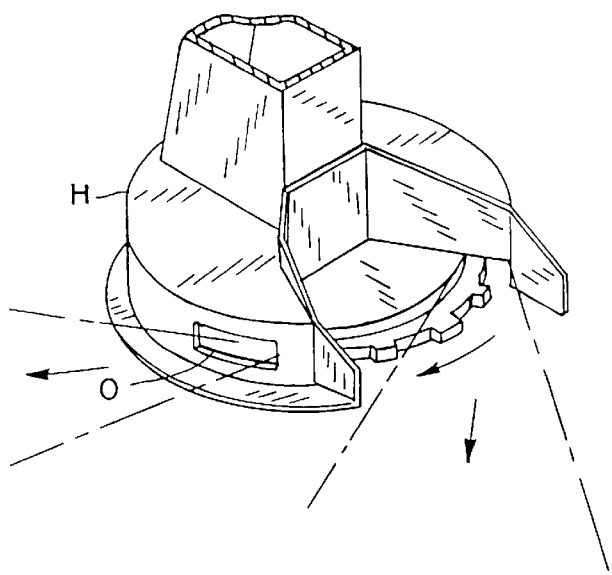
FIG. 3 is a perspective view of a prior art disc saw felling head portion of a feller buncher, illustrating a chip discharge window O in the side of the housing and illustrating with phantom lines and straight arrows chip discharge directions.
Figure 4:
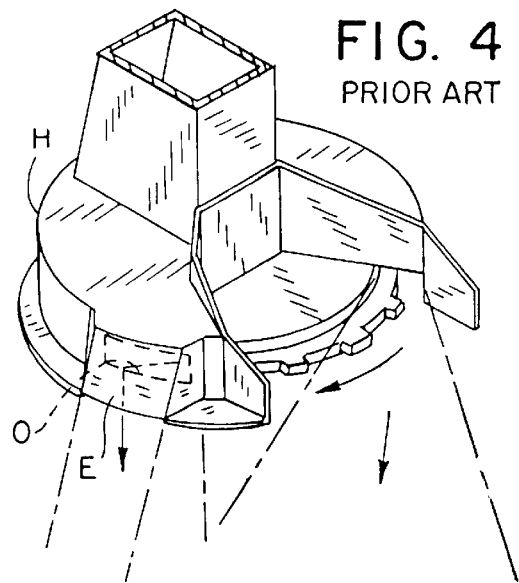
FIG. 4 is a view similar to FIG. 3, but with a deflection plate E provided over the window O.
Figure 1:
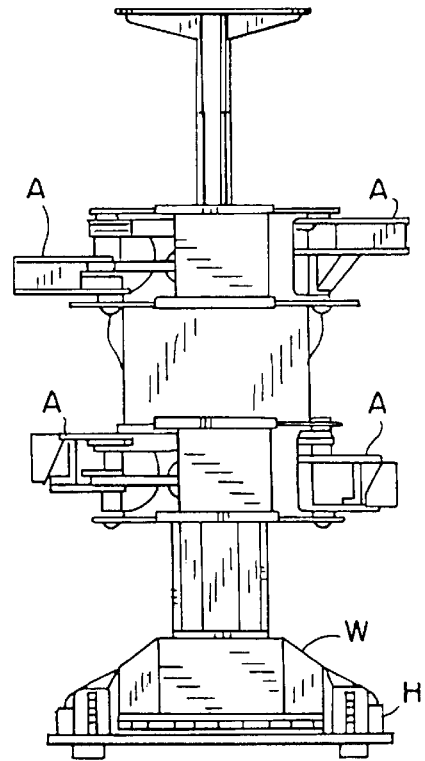
FIG. 1 is a front plan view of a typical disc saw feller buncher head to which the present invention can be applied.
Figure 2:
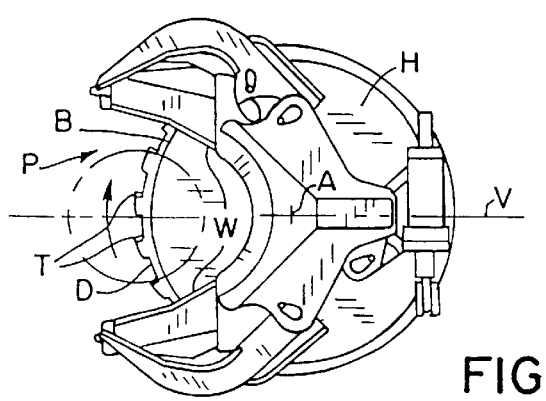
FIG. 2 is a top plan view of the feller buncher head of FIG. 1.

Instead, the majority of chips are thrown against the deflector plate 20 and are bounced off of the deflector plate 20 back toward the center of the pocket. To this end, it is preferred that the outwardly directed angle α between the line $T_C$ and the deflector plate 20 be obtuse (i.e., 90°<α<180°), such that chips will bounce off of the deflector plate 20 in a direction Z (FIG. 11) which is toward the front or center of machine travel V (FIG. 2), for example toward the tree or toward the far side of the tree opposite from the side the head is on, but in any event away from the blade disc.

This bouncing removes considerable energy from the chips and also reduces the number of different directions in which chips are thrown, and does not throw them behind the head. It also helps prevent the housing from becoming clogged, because fewer chips enter it. It does so without providing an additional hole, window, chute or duct in the housing, which itself is prone to clogging.

As illustrated, the line C coincides with the path of the inner perimeter of the teeth. However, it need not. The inner perimeter of the chip packing depth may be radially inwardly from the inner perimeter of the tooth path, for example at the base of the tooth gullet space, which places a limit on the inner perimeter of the chip packing depth. In the illustrated embodiment, there is not a substantial difference between the base of the gullet and the inner perimeter of the tooth path. However, in other disc structures, the base of the gullet may be spaced inwardly a substantial distance from the inner perimeter of the tooth path, such that the inner perimeter of the chip packing depth may fall radially between the inner perimeter of the tooth path and the base of the tooth gullet. The inner perimeter of the chip packing depth could also be radially outwardly from the inner perimeter of the tooth path for a given saw blade design.

Figure 5:
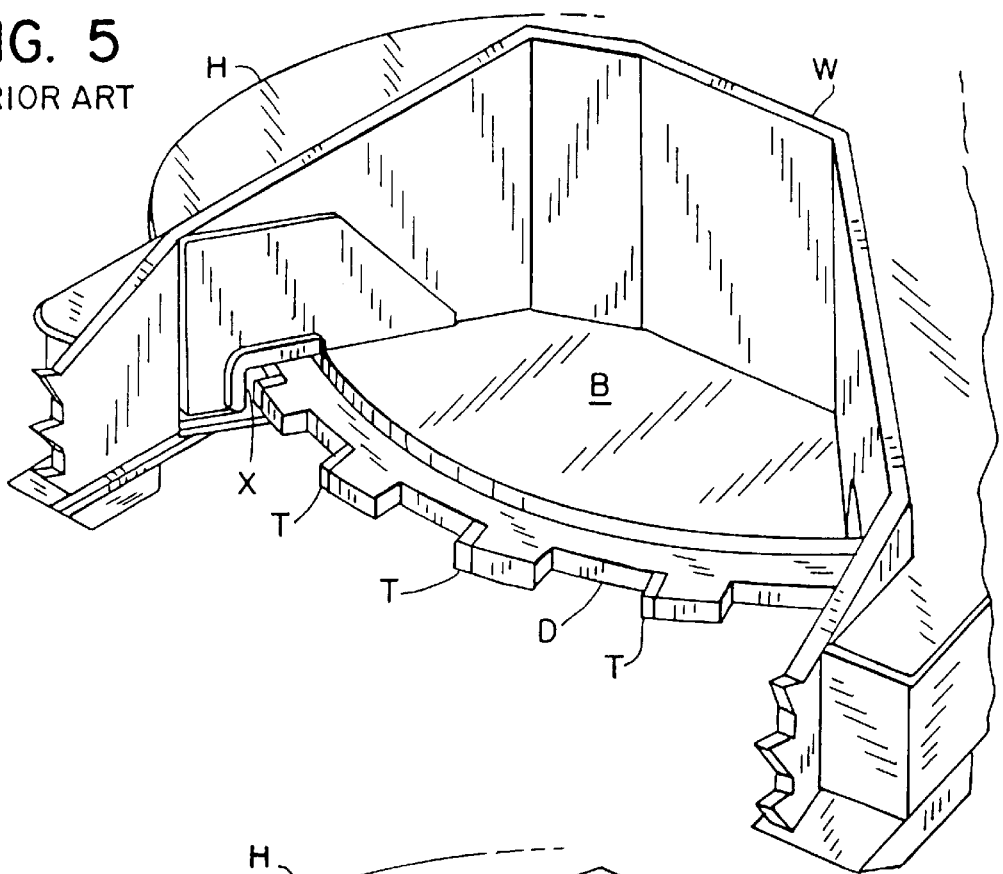
FIG. 5 is a perspective view illustrating a prior art construction of a felling head housing entry opening into the housing.
Figure 12:
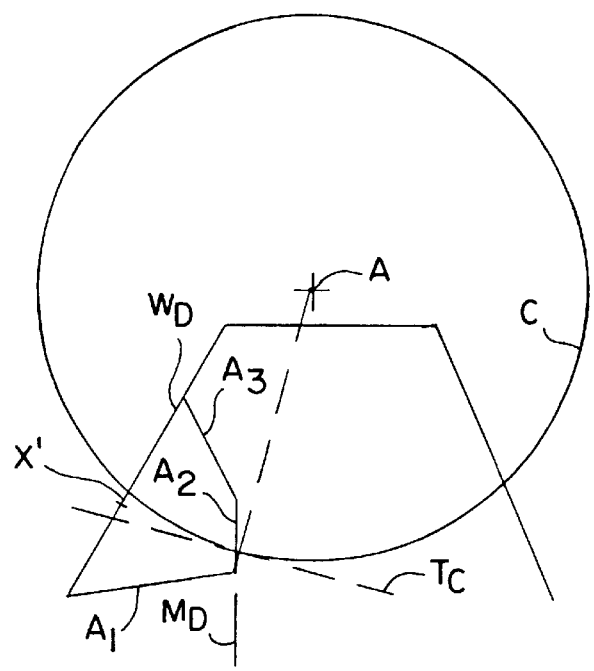
FIG. 12 is a schematic top view of a modification to a center pocket head of the type shown in FIG. 5 so as to incorporate the invention.

It is also possible to apply the invention to heads which do not have a ramped portion R of the butt plate B, such as the center pocket head shown in FIG. 5. In such a head, the pocket walls at or above the butt plate on the downstream side of the pocket could be built out or have an addition added to them. Such building out or addition would be to an extent to move the downstream edge $M_D$ of the mouth far enough away from the housing entry opening X' along the tooth path so that the tangent line $T_C$ where the downstream edge $M_D$ of the mouth crosses the inner perimeter C of the chip packing depth falls radially outside of the housing entry opening X'. A schematic showing such added on or built out pocket walls at or above the butt plate is illustrated in FIG. 12, the old downstream pocket wall being identified by $W_D$, and the added on or built out walls being identified by $A_1$, $A_2$ and $A_3$.

Figure 13:
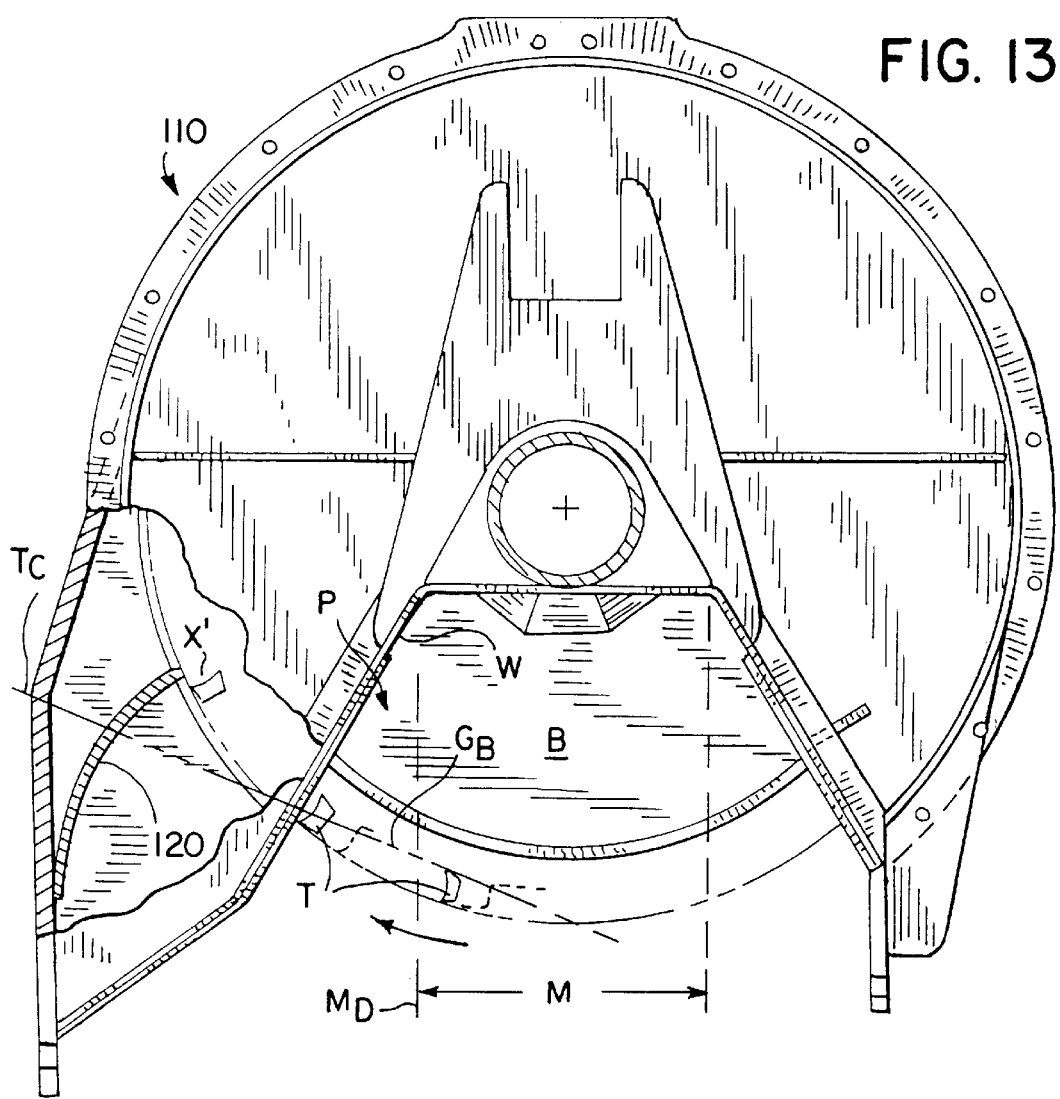
FIG. 13 is a top plan view with a portion broken away of an alternate way to incorporate the invention into a center pocket head, illustrated with the blade and teeth in phantom.
Figure 14:
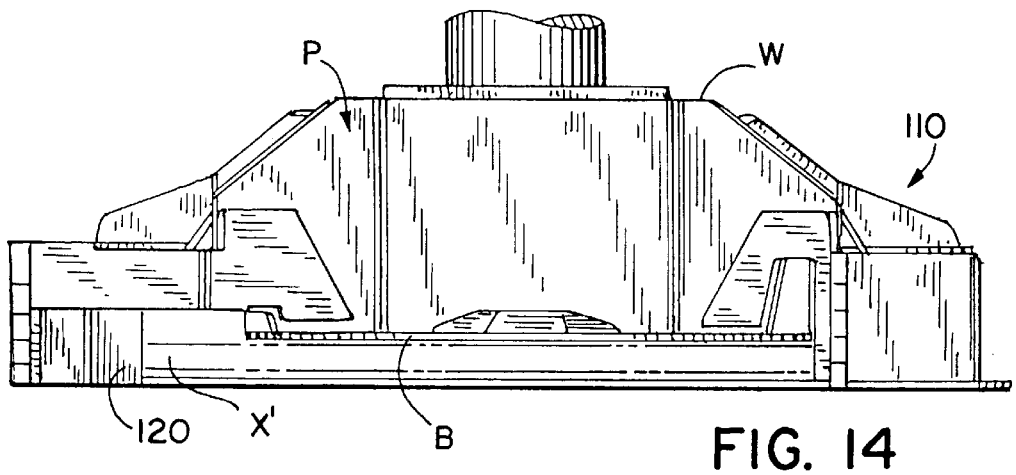
FIG. 14 is a front plan view of the head of FIG. 13, without the blade.

Alternatively, an exemplary embodiment of a center pocket head 110 incorporating the invention is illustrated in FIGS. 13 and 14. In this embodiment, the pocket walls W are not built out, so the pocket size and therefore accumulating capacity is not diminished. In this embodiment, the housing entry opening X', which is adjacent to the inward end of the deflector plate 120, is far enough downstream of the mouth M of the pocket (defined by the rear corners of the pocket) and the deflector 120 is shaped and oriented so that chips exiting the kerf are bounced against the deflector 120 and rebound in a direction away from the housing entry opening X' and saw disc. In this embodiment, the deflector plate 120 is curved; any shape which accomplishes the objects of the invention could be used. Also, tangent line $T_C$ is drawn from the point at which the downstream edge of the mouth $M_D$ crosses the base $G_B$ of the tooth gullet space, indicating that in this design the chips are intended to be packed to a limited extent against the edge $G_B$ of the disc in the tooth gullet space.

Figures 15, 16:
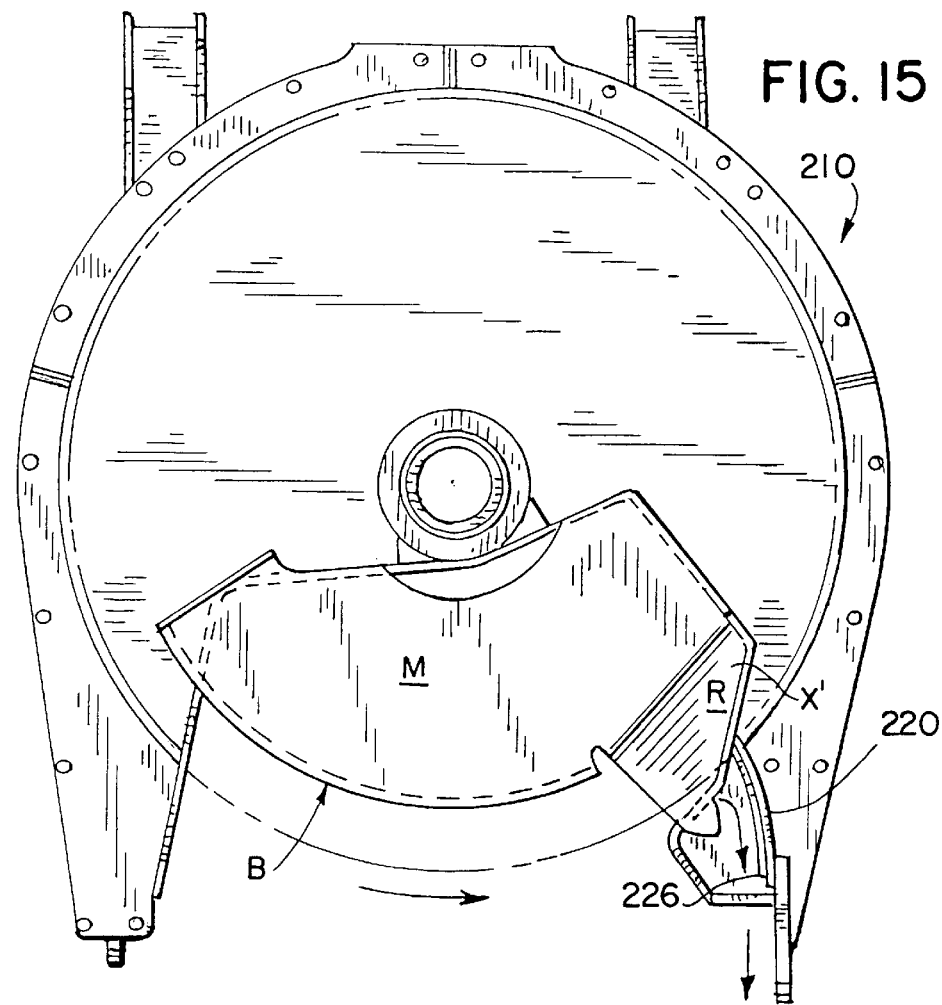
FIG. 15 is a bottom plan view of an alternate way to incorporate the invention in a side pocket head, like the head of FIG. 6, illustrated without the blade.
FIG. 16 is a bottom perspective view of the head of FIG. 15, with the lower guards and skis removed, and with the blade shown in phantom.

FIGS. 15 and 16 illustrate an alternate side pocket head 210. The head 210 is essentially the same as the head 10, except that the deflector plate 220 is curved like the deflector plate 120, rather than straight, as is the plate 20. The curved plates 120 and 220 provide a smoother chip flow, and also make it easier to clad the area with a serviceable wear resistant plate, such as the plate 226. The wear resistant plates 26 and 226, or the plates 20, 120 or 220 themselves, may be heat treated steel plate. Under highly abrasive conditions, i.e., sandy soil, these plates may be made of a more wear resistant material, such as chromium carbide, Stellite™, or other suitable material.

Many modifications and variations to the preferred embodiment described will be apparent to those skilled in the art. For example, the invention could be applied to many different pocket shapes. In addition, the invention is not limited to the deflector 20, 120 or 220 being vertically oriented, but it could be angled downwardly, so as to deflect chips toward the ground. Therefore, the invention should not be limited to the embodiments described, but should be defined by the claims which follow.

We claim:

1. In a disc saw felling head of the type having:
    a rotary blade disc which is rotatable about a generally vertical axis and has peripherally spaced teeth;
    a housing enclosing said teeth on at least two sides of said teeth in a rearward shielded zone of said head and exposing said teeth to a tree in a forward cutting pocket of said head, said teeth moving in a circular tooth path from said cutting pocket into said shielded zone at a housing entry opening in said housing when said blade is rotated, said tooth path having a cutting zone at the front of said cutting pocket in which said teeth are exposed to cut a tree;
    a butt plate supported by said head over said disc in said cutting pocket of said head for supporting a cut end of a tree over said disc; and
    pocket walls generally vertically disposed about sides and a rear of said cutting pocket;
    the improvement wherein a chip deflector is provided radially outward of said housing entry opening, said chip deflector being positioned angularly relative to said cutting zone so as to prevent chips from entering said housing and bounce chips off of said deflector away from said disc as a tree is being cut.

2. The improvement of claim 1, wherein a downstream edge of said cutting zone is defined by an inner corner of a ramp surface of said butt plate.

3. The improvement of claim 1, wherein a downstream edge of said cutting zone is defined by said pocket walls.

4. The improvement of claim 1, wherein a downstream edge of said cutting zone of said tooth path is spaced upstream along said tooth path from said entry opening by a distance such that a tangent line drawn at the inner perimeter of said chip packing depth at the point at which said inner perimeter crosses a line drawn in the machine direction at said downstream edge of said cutting zone does not intersect said housing entry opening.

5. The improvement of claim 4, wherein a deflector plate extends radially outward from said housing entry opening, and said tangent line intersects said deflector plate.

6. The improvement of claim 5, wherein a portion of said deflector plate which is radially outward of said tangent line and said tangent line form an obtuse angle.

7. The improvement of claim 5, wherein said deflector plate is straight.

8. The improvement of claim 5, wherein said deflector plate is curved.

9. The improvement of claim 1, wherein between said pocket and said housing entry opening, said teeth follow a path which is bordered on its upper side by a wall of said head.

10. The improvement of claim 9, wherein between said pocket and said housing entry opening, said teeth follow a path which is open forwardly of said teeth in the machine direction and open on the side of said teeth which is opposite from said butt plate.

11. The improvement of claim 1, wherein a downstream edge of said cutting zone of said tooth path is spaced upstream along said tooth path from said entry opening by a distance such that a tangent line drawn at a base of said tooth gullet space at the point at which said base crosses a line drawn in the machine direction at said downstream edge of said cutting zone does not intersect said housing entry opening.

12. The improvement of claim 11, wherein a deflector plate extends radially outward from said housing entry opening, and said tangent line intersects said deflector plate.

13. The improvement of claim 1, wherein said deflector is oriented so as to bounce chips in a direction which is back toward said tree as said tree is cut.

14. The improvement of claim 1, wherein said direction is toward a side of said tree which is opposite from said disc.

* * * * *